Figure 1:
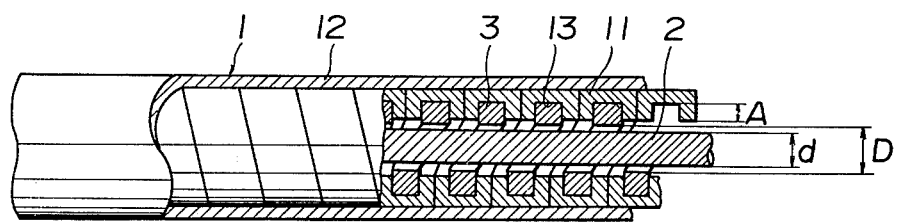

United States Patent [19]

Nagano

[11] 4,265,140
[45] May 5, 1981

[54] OPERATING CABLE

[75] Inventor: Masashi Nagano, Sakai, Japan

[73] Assignee: Shimano Industrial Company, Limited, Osaka, Japan

[21] Appl. No.: 47,564

[22] Filed: Jun. 11, 1979

[30] Foreign Application Priority Data

Jun. 15, 1978 [JP] Japan ................................. 53-83769

[51] Int. Cl.³ .............................................. F16C 1/10
[52] U.S. Cl. ............................................... 139/501 R
[58] Field of Search ................ 74/501 R, 501 P, 502; 64/2 R, 3

[56] References Cited

U.S. PATENT DOCUMENTS

| | | | |
|---|---|---|---|
| 3,015,969 | 1/1962 | Bratz | 74/501 R |
| 3,152,459 | 10/1964 | Hansen | 74/501 R |
| 3,214,995 | 11/1965 | Gilmore | 74/501 R |
| 3,518,896 | 7/1970 | Zieber et al. | 74/501 R |

Primary Examiner—Henry Jaudon
Attorney, Agent, or Firm—Stevens, Davis, Miller & Mosher

[57] ABSTRACT

An operating cable composed of an outer tube which is made cylindrical through the winding operation of a band-shaped steel-sheet in a spiral shape, and an inner wire which is inserted into the outer tube and is guided by the outer tube. A groove which is open on at least the winding inner side of the band-shaped steel-sheet is provided, in the band-shaped steel-sheet, along the length direction. A band-shaped liner is engaged into the groove to project from the winding inner side of the band-shaped steel-sheet. The depth of the groove is made greater than a distance D-d, where D is the outer diameter of the operating wire and d is the winding inner diameter of the liner in the outer tube, which is formed by the winding operation of the band-shaped steel-sheet with the liner engaged in the band-shaped steel-sheet.

5 Claims, 3 Drawing Figures

OPERATING CABLE

The present invention mainly relates to an operating cable for operating a speed change gear or a brake for use in a bicycle. More particularly the invention relates to an operating cable comprising an outer tube which is formed into a cylindrical tube by the winding of a band-shaped steel-sheet in a spiral shape and an inner wire which is inserted into the outer tube and guided by the outer tube.

Conventionally, to make an outer tube of this type, a band-shaped steel-sheet was spirally wound into a cylindrical shape and the inner wire was inserted into the outer tube. However, to reduce the frictional resistance of the inner wire against the inner face of the outer tube, a thin liner tube of synthetic resin was inserted into the inner face of the outer tube. However, according to the outer tube, the liner tube was required to be inserted under close contact conditions. It was extremely difficult to insert the thin and small-diametered liner tube into the outer tube, resulting in the use of excessive labor and deteriorated operating efficiency, since the interior of the outer tube had many seams due to the band-shaped steel-sheet, the inner diameter of the outer tube was smaller, and the outer tube was flexible. Furthermore, the liner tube might be pulled out from the interior of the band-shaped steel-sheet after insertion.

The present invention was provided to overcome the above disadvantages. An object of the present invention is to provide an operating cable which has less frictional resistance against the wire, does not allow the liner to be pulled out from the groove, is superior in strength and is easy to manufacture. Namely, the present inventor has investigated the above-described problems with the conventional operating cable using the liner to find out the reason that the tube is inserted into the outer tube as a liner. According to the present invention, the band-shaped liner, which is not the tube, is adapted to be engaged, before the winding operation, into a band-shaped steel-sheet forming the outer tube. Furthermore, the engagement is performed by the use of the groove in the band-shaped steel-sheet. The depth of the groove is made greater than the distance D-d where d is the outer diameter of the inner wire and D is the winding inner diameter of the liner projecting onto the winding inner side of the band-shaped steel-sheet. Thus, even if the band-shaped liner is pulled out from the groove, the inner wire prevents the liner from being disengaged.

The present invention is characterized in that a groove which is open on at least the winding inner side of the band-shaped steel-sheet is provided, along the length direction, in the band-shaped steel-sheet, the band-shaped liner is engaged into the groove to project from the winding inner side of the band-shaped steel-sheet, and the depth of the groove is made greater than the distance D-d where d is the operating wire outer diameter, and D is the winding inner diameter of the liner in the outer tube, which is formed through the winding operation of the band-shaped steel-sheet with the liner being engaged thereinto.

Figure 2:
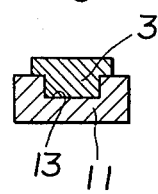
Figure 3:
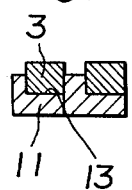

The aforesaid objects of the present invention and others will be apparent from the following description and also characteristics of the present invention will be fully understood in the description hereinafter in accordance with the accompanying drawings, in which FIG. 1 is a fragmentary broken front view showing one embodiment of a cable according to the present invention, and FIG. 2 and FIG. 3 are enlarged sectional views each showing a portion between an outer tube and a liner.

Referring to FIG. 1, the reference numeral 1 is an outer tube. The reference numeral 2 is an inner wire which is inserted into the outer tube 1 so that the inner wire may be guided by the outer tube 1. The outer tube 1 is rectangular in section. A band-shaped steel-sheet 11 of 0.6 to 0.7 mm in thickness and of 1.2 to 1.3 mm in width is spirally wound into a cylindrical shape and a cylindrical cover 12 made of synthetic resin is coated on the outer peripheral portion of the steel-sheet. The band-shaped steel-sheet 11 has a groove 13 along the length direction thereof, and a band-shaped liner 3 made of synthetic resin is engaged into the groove 13. The groove 13 is open onto the inner side facing the interior of the outer tube when the band-shaped steel-sheet 11 has been spirally wound.

Referring to FIG. 1 and FIG. 2, the groove 13 is provided in the central portion along the width direction of the band-shaped steel-sheet 11.

The liner 3 of, principally, 0.5 mm in thickness and 0.6 to 0.7 mm in width to be engaged into the groove 13 is rectangular in section and engaged into the groove 13. When the liner has been engaged into the groove 13, the liner projects approximately 0.2 mm in the winding inward direction from the inner side face when the band-shaped steel-sheet has been wound.

Also, the length A between the open face, in the band-shaped steel-sheet 11, of the groove 13 and the groove bottom face opposite to the open face is made greater than a distance, D-d, where d is the outer diameter of the inner wire 2, and D is the winding inner diameter of the liner 3 in the outer tube 1. Concretely, the length A is made 0.3 mm as described hereinabove.

Even if the liner 3 is pulled out from the groove 13 of the band-shaped steel-sheet 11, the liner 3 is prevented from being disengaged from the groove 13, since the liner 3 comes into contact against the inner wire 2 without fail before the liner is pulled out from the groove 13.

According to the present invention, the liner 3 which is engaged into the groove 13 as shown in FIG. 2 may be made approximately T-shaped in section.

Also, as shown in FIG. 3, the band-shaped steel-sheet 11 is made rectangular in section. The groove 13 is formed into the above-described winding inner side and a side face adjacent to the inner side. When the band-shaped steel-sheet 11 has been spirally wound, the side face of the adjacent band-shaped steel-sheet 11 is brought into contact, whereby the groove 13 may be made rectangular in shape to engage the rectangular liner 3 into the groove 13.

As described hereinabove, in the cable of the present invention, the groove is provided in the band-shaped steel-sheet and the liner is engaged into the groove. The band-shaped steel-sheet is spirally wound, whereby the outer tube can be formed extremely easily. Accordingly, the inexpensive cable can be provided due to the improved operational efficiency.

Also, since the liner is partially projected into the outer tube and is spirally located, the inner wire comes into linear contact, in a given space, against the liner. Accordingly, the frictional resistance of the wire is made extremely small to perform the smoother sliding operation of the wire. The strength of the band-shaped steel-sheet is not damaged although the groove is provided in the band-shaped steel-sheet, since the liner is engaged into the groove.

In addition, according to the present invention, the depth of the groove is made larger than D-d, where d is the outer diameter of the inner wire, and D is the winding inner diameter of the liner in the outer tube. Thus, even if the liner is pulled out from the groove, the liner comes into contact against the wire. Thus, the liner is positively prevented from being pulled out of the groove, thus ensuring the smoother sliding operation of the wire through the liner.

Also, according to the present invention, since the liner partially projects into the outer tube as described hereinabove and the liner is located in a given space, the frictional particles from the wire or the liner caused by the sliding operation of the wire or particles entering from the outside are accommodated into the liner space. Therefore, the sliding operation of the wire can be smoothly performed without being interfered with by these particles.

As many apparently widely different embodiments of the present invention may be made without departing from the spirit and scope thereof, it is to be understood that the present invention is not limited to the specific embodiment thereof except as defined in the appended claims.

What is claimed is:

1. An operating cable comprising an outer tube which is made cylindrical by the winding operation of a band-shaped steel sheet in a spiral shape, and an inner wire which is inserted into the outer tube and is guided by the outer tube, said band-shaped steel sheet having a groove along its length direction, and a band-shaped liner to be engaged into the groove, said groove being open onto at least the inner side of when said band-shaped steel sheet has been wound, said liner being projected in the winding inward direction from the inner side face of said band-shaped steel sheet when the liner has been engaged into said groove, and the length between the open face, in said band-shaped steel sheet, of said groove and the groove bottom face opposite to said open face being greater than a distance represented by D-d, where d is the outer diameter of said inner wire, and D is the inner diameter of said liner in said outer tube.

2. The operating cable according to claim 1, wherein the sectional shape of said liner is made rectangular.

3. The operating cable according to claim 1, wherein the sectional shape of said liner is made T-shaped.

4. The operating cable according to claim 1, wherein said band-shaped steel-sheet is made rectangular in section and has said griive which is open to the width direction central portion on the winding inner side.

5. The operating cable according to claim 1, wherein said band-shaped steel-sheet is made rectangular in section and has a groove which is open to the winding inner side face and the side face adjacent to said inner side face.

* * * * *